US012332785B2

(12) United States Patent
Colombel et al.

(10) Patent No.: US 12,332,785 B2
(45) Date of Patent: Jun. 17, 2025

(54) PRECOMPUTED CACHE VALIDATION

(71) Applicant: Amadeus S.A.S., Biot (FR)

(72) Inventors: Cyril Colombel, Pégomas (FR);
Francesco Fronte, Valbonne (FR);
Giovanni Giorgi, Bengaluru (IN);
Camille Brugel, Grasse (FR); Pierre Feuillet, Antibes (FR)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 18/564,688

(22) PCT Filed: May 4, 2022

(86) PCT No.: PCT/EP2022/062053
§ 371 (c)(1),
(2) Date: Nov. 28, 2023

(87) PCT Pub. No.: WO2022/253515
PCT Pub. Date: Dec. 8, 2022

(65) Prior Publication Data
US 2024/0273020 A1  Aug. 15, 2024

(30) Foreign Application Priority Data

Jun. 1, 2021 (EP) .................................. 21305735

(51) Int. Cl.
*G06F 12/08* (2016.01)
*G06F 12/0802* (2016.01)
(52) U.S. Cl.
CPC ................. *G06F 12/0802* (2013.01)
(58) Field of Classification Search
CPC .................................................. G06F 12/0802
See application file for complete search history.

(56) References Cited

U.S. PATENT DOCUMENTS

| 2003/0182357 A1* | 9/2003 | Chess ................. G06F 16/9574 |
| | | 709/230 |
| 2008/0167907 A1* | 7/2008 | Marcken ................ G06Q 10/02 |
| | | 705/5 |
| 2013/0073586 A1 | 3/2013 | Aubry et al. |

FOREIGN PATENT DOCUMENTS

WO  2013160721 A1  10/2013

OTHER PUBLICATIONS

European Patent Office, International Search Report and Written Opinion issued in International patent application serial No. PCT/EP2022/062053 on Jul. 19, 2022, 14 pages.

* cited by examiner

*Primary Examiner* — Jae U Yu
(74) *Attorney, Agent, or Firm* — Thompson Hine LLP

(57) ABSTRACT

Methods, systems, and computer program products for implementing a precomputed availability cache that is a database of precomputed availabilities for availability searches. An availability request is received. Segmentation data that includes one or more segments is obtained. An associated segmentation entry within a precomputed availability cache is determined for each of the one or more segments. A validity check of the availability data that indicates that at least one of the availabilities for the segments is invalid is performed. An availability for the at least one of the availabilities for the segments is invalid is determined by accessing an inventory database replication and processing an availability computation for the at least one of the availabilities. The cache is updated with the determined availability for the at least one of the availabilities. Availability results that include availabilities for each of the one or more segments are provided.

18 Claims, 11 Drawing Sheets

PRECOMPUTED CACHE VALIDATION

TECHNICAL FIELD

The present invention generally relates to computers and computer software, and more specifically, to methods, systems, and computer program products for pre-computing and caching database query results and strategies of keeping these results up-to-date.

BACKGROUND

In order to be able to handle database queries or batch computation requests that require computations on the basis of large volumes of underlying data, search results corresponding to expected queries are generally pre-computed and stored as database records in a database. This database is queried by requesting entities (such as clients, applications, browsers installed on user terminals, etc.) in the course of a search. In response to the query, pre-computed search results fulfilling search criteria indicated by the query are returned to the client. Subsequently, the term "query" is used as a general term including any type of information retrieval requests, such as transactional queries, requests for batch computations, etc.

A common problem in database technology is to ensure short response times to database queries which require processing large volumes of data. For example, such computing-power consuming processing has to be performed in response to so-called "open queries" which contain only little input information (e.g., only one or two parameters out of a dozen possible parameters are specified and/or the specified value ranges of the parameters are broad) and, consequently, lead to a large number of results in general. Possibilities to speed up data processing by increasing hardware performance are limited. Thus, attention is drawn to improving the mechanisms underlying the processing of large data volumes.

One general approach to shorten query times is to pre-compute expected queries and to maintain the corresponding query results in a cache system. Queries are then actually not processed on the large data basis but are directed to the cache system.

Another issue, however, which comes along with such caching approaches, is to keep the pre-computed query results up-to-date in order to ensure that queries responded by the cached results correctly reflect the status of the corresponding large data basis. In case the underlying data changes, the cached query results get outdated and the cache system would return incorrect results. Thus, strategies are needed how the cache system can be kept up-to-date.

Various relatively simple update strategies include, for example, re-computing the entire data domain frequently, establishing and maintaining re-computation schedules manually, and re-computing data when they are getting too old.

Thus, improved methods, systems, and computer program products for providing faster, more accurate, and less expensive results for availability searches than current availability cache systems are needed.

SUMMARY

In embodiments of the invention, a method for implementing a precomputed origin and destination availability (PONDA) cache that is a database of precomputed availabilities for availability searches. The method includes receiving, at an availability determination server from an availability gateway, an availability request from a requestor. The method further includes obtaining, based on the availability request, segmentation data that includes one or more segments. The method further includes determining that each segment includes an associated segmentation entry within a precomputed origin and destination availability (PONDA) cache by reading availability data for the segmentation data from the PONDA cache, wherein the availability data includes availabilities for the one or more segments. The method further includes performing a validity check of the availability data that indicates that at least one of the availabilities is invalid. The method further includes determining an availability for the at least one of the availabilities by accessing an inventory database replication and processing an availability computation for the at least one of the availabilities. The method further includes updating the PONDA cache with the determined availability for the at least one of the availabilities. The method further includes providing, via the PONDA cache, availability results that include availabilities for each of the one or more segments, including the determined availability for the at least one of the availabilities.

These and other embodiments can each optionally include one or more of the following features.

In some embodiments of the invention, performing the validity check of the availability data includes determining, based on a validity identifier accessed via the inventory database replication, whether a version of the one or more segments is mismatched with an associated version entry of the PONDA cache.

In some embodiments of the invention, the version of the one or more segments is mismatched with the associated version entry of the PONDA cache is determined based on data from an originator profile.

In some embodiments of the invention, the originator profile is associated with segmentation data stored in the PONDA cache, and the originator profile includes a plurality of validity identifiers that are each associated with a respective data source of a plurality of data sources.

In some embodiments of the invention, obtaining the segmentation data that includes the one or more segments includes determining a plurality of segmentation blocks associated with the one or more segments.

In some embodiments of the invention, determining the availability for the at least one of the availabilities by accessing the inventory database replication and processing the availability computation for the at least one of the availabilities includes receiving, from the inventory database replication, revenues management data, bookings data, and configurations data associated with the at least one of the availabilities, and determining, via an availability computation algorithm, the availability for the at least one of the availabilities based on the revenues management data, the bookings data, and the configurations data associated with the at least one segment.

In some embodiments of the invention, the method further includes determining whether to keep or to purge the availability request and the associated segmentation entries from the PONDA cache based on popularity data.

In some embodiments of the invention, determining whether to keep or to purge the availability request and the associated segmentation entries from the PONDA cache is further based on a search threshold associated with one or more providers that are associated with the availability results.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Generally, systems, methods, devices, and techniques are provided for implementing a precomputed origin and destination availability (PONDA) cache that is a database of precomputed availabilities that provides fast, accurate, and less expensive results for availability searches than current availability cache systems. In particular, the PONDA cache is tailored to the airline inventory data model.

The availability computation process splits the availability request into several blocks that can be stored independently in the PONDA cache such that every computation block can be reused on different availability requests. For example, a travel availability request (input) could include a determination block (travel segment A-B-C), and split into separate availability blocks for each of the travel block (e.g., travel segments A-B, B-C, and A-B-C). In complement of previous process but still to ensure the correctness of the data stored, availabilities stored in PONDA are segmented using specific business criteria called originator profiles (airline agents, travel agencies, metasearch engines, other GDS, or location of the requestor), the data used for this granularity depending again of the revenue management used by airline (granularity optimized to reduce cache space). For example, for the same block A-B (example above), if the revenue management of the airline is based on country of originator, several availabilities may be stored in PONDA, one for a certain originator country (e.g., France "FR") and others for different originator countries (e.g., United States "US", Australia "AU", etc). For example, for a flight London to Singapore (e.g., "LHR-SIN") there may be more availabilities for a certain class for people booking from France than people booking from USA (or vice-versa).

Then, to take into account the volatility of source data used during computation, the PONDA cache provides an accurate solution by storing these small pieces of computation blocks directly linked to source data instead of the final availability, to easily invalidate availabilities in case of updates. For example, availability bricks (computation blocks) in the inventory database are flagged with a data footprint used at computation time (e.g., using validity identifiers such as hash values, time stamps, etc., for each data source entry). When an availability is retrieved from PONDA cache, the entry is used only if the data-footprint matches with the current local one. In case of PONDA footprint mismatch, the entry is considered as obsolete and a new computation is triggered and the updated availability is replaced in the PONDA cache (e.g., lazy feeding/invalidation).

Figure 1:
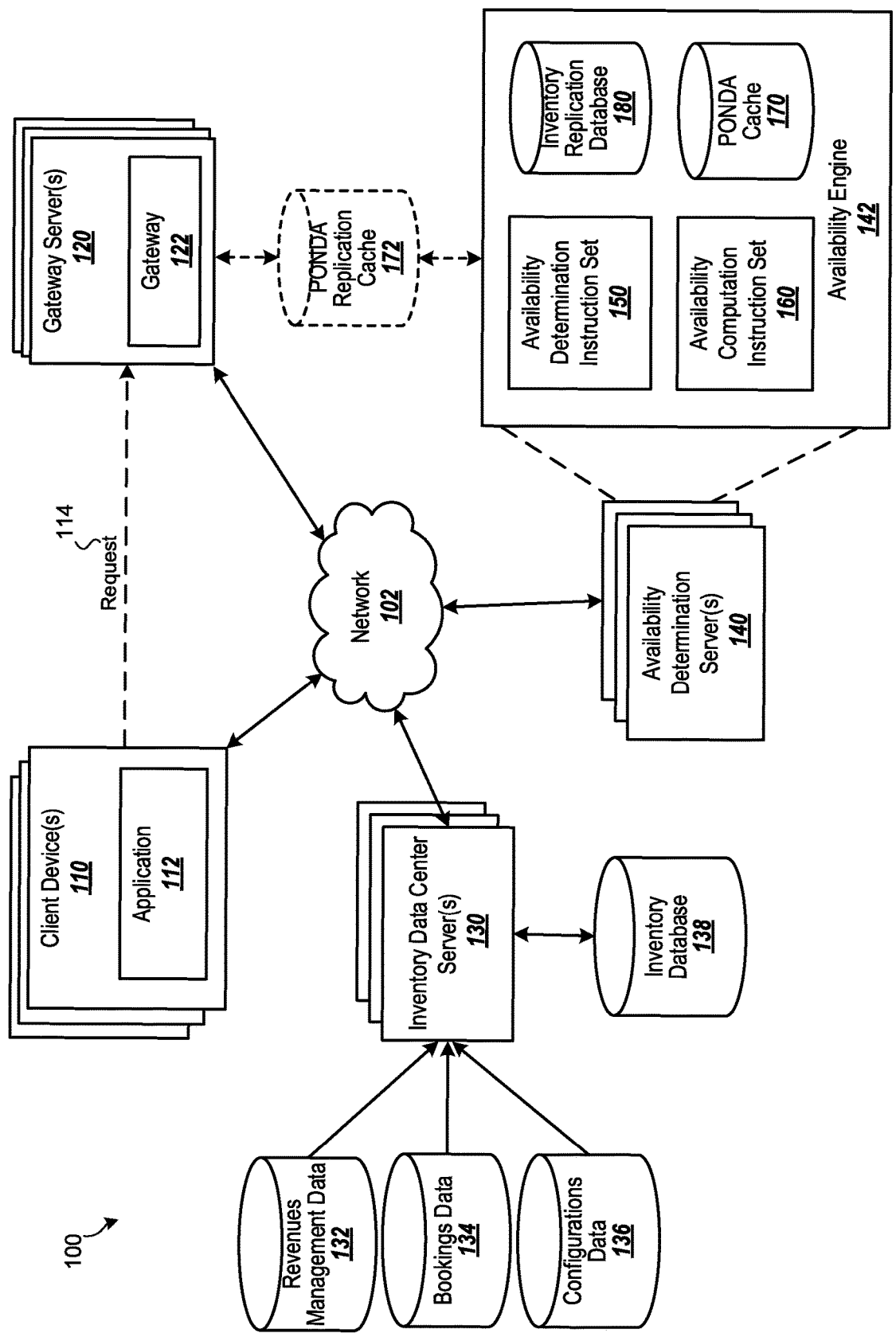
FIG. 1 illustrates a distributed database environment utilizing a precomputed origin and destination availability (PONDA) cache, according to embodiments of the invention.

FIG. 1 is an example environment 100 of a distributed database environment utilizing a precomputed origin and destination availability (PONDA) cache in which a device communicates an availability request to an availability determination server via a gateway server, according to embodiments of the invention. The example environment 100 includes a client device 110, one or more gateway server(s) 120, one or more inventory data center server(s) 130, and one or more availability determination server(s) 140, that communicate over a data communication network 102, e.g., a local area network (LAN), a wide area network (WAN), the Internet, a mobile network, or a combination thereof.

The client device 110 (e.g., a device used by a requestor) can include a desktop, a laptop, a server, or a mobile device, such as a smartphone, tablet computer, wearable device (e.g., smartwatch), in-car computing device, and/or other types of mobile devices. The client device 110 includes applications, such as the application 112, for managing the availability request and availability results to/from a PONDA cache of the one or more availability determination server(s) 140 via the gateway server(s) 120. The client device 110 can include other applications. The client device 110 initiates an availability request 114 by a requestor via application 112. The availability request 114 may include availability search queries by requesting entities (such as clients, applications, browsers installed on user terminals, etc.) in the course of a search (e.g., airline booking search). A requestor of an availability request 114 may include an airline agency, travel agency, metasearch engine, other dedicated global distribution systems (GDS), as for example airlines reservation systems which provide flight search applications for shopping business like flight booking, and the like.

The gateway 122 of the gateway server(s) 120 manages the location of the availability requests 114 received from application 112 from the one or more client devices 110. The management protocols of gateway server 120 may be based on a redundant load-balancing system by managing multiple clients (e.g., client device(s) 110) so that an availability request 114 is handled by one of the one or more availability determination server(s) 140. For example, there may be multiple availability determination server(s) 140 that are able to service the availability request 114, and the redundant load-balancing system of the gateway server(s) 120 is responsible for ensuring that the availability request 114 is performed by one of the capable availability determination server(s) 140.

The gateway server(s) 120 may be front end server(s) for managing, collecting, processing, and communicating availability queries (e.g., availability request 114), resource information, revenues management data, bookings data, airlines/system configurations data, etc., that is stored in the inventory database 138 from one or more inventory data center server(s) 130. Further, the gateway server(s) 120 may be front end server(s) for managing, collecting, processing, and communicating availability results from one or more availability determination server(s) 140 to the client devices 110 via application 112. Additionally, or alternatively, the gateway server(s) 120 can directly access availability results from a PONDA replication cache 172, as further discussed herein. In an exemplary embodiment, for an airline booking example, the gateway server(s) 120 may be front end server(s) for collecting, processing, and storing travel information (e.g., flight schedules, flight information such as such as departure and destination airport, airline, departure and return dates, fares, booking classes, passenger information, and the like) from a plurality of external travel systems (e.g., airport information systems, airline information systems, third-party intermediator systems, etc.) via the one or more inventory data center server(s) 130 from the collective inventory database 138, and/or the one or more availability determination server(s) 140.

The one or more inventory data center server(s) 130 receives and processes travel inventory data such as revenue data stored in a revenues management database 132 from one or more revenue management system(s), bookings data stored in a bookings database 134 from one or more bookings management system(s), airlines/system configurations data from a configurations database 136 from one or more airlines/system configurations management system(s), and the like. The one or more inventory data center server(s) 130 stores the travel inventory data from the multiple sources (e.g., revenues management database 132, bookings database 134, configurations database 136, etc.) in an inventory database 138.

The one or more availability determination server(s) 140 receives and processes, via the availability engine 142, the availability request(s) 114 from the gateway server(s) 120. The availability engine 142 includes an availability determination instruction set 150, an availability computation instruction set 160, a PONDA cache 170, and the inventory replication database. The PONDA cache 170 is a precomputed origin and destination availability (PONDA) cache that is a database of precomputed availabilities that provides fast, accurate, and less expensive results for availability searches (e.g., availability request 114). In an exemplary embodiment, the inventory database 138 can be accessed and replicated by the one or more availability determination server(s) 140 from the one or more inventory data center server(s) 130. For example, the availability engine 142 can replicate the inventory data stored in the inventory database 138 in the inventory replication database 180). The inventory replication database 180 provides redundancy and quicker access to the data. In some implementations, the PONDA cache 170 may be replicated and directly accessed by the gateway 122 via the PONDA replication cache 172.

The availability determination instruction set 150 is configured to implement PONDA cache processes described herein. For example, the availability determination instruction set 150 determines whether the availability request 114, and the associated segmentation data 220 is available (e.g., precomputed and up-to-date) in the PONDA cache 170 for each segment, or determine that the availability computation instruction set 160 needs to compute (or recompute) the availability for the availability request (and each segment therein). Determination of availability is based on an availability footprint analysis to determine that for each segmentation data block in the PONDA cache 170 matches a corresponding data block in the inventory replication database 180 based on the data footprint (e.g., identifiers within the data), as further described herein with reference to FIG. 5. The availability computation instruction set 160 is configured to compute availability results from segmentation data determined from an availability request 114. The processes of the availability computation instruction set 160 are split into two different blocks: 1) origin and destination determination (OND_DETs) to determine segments within the availability request 114; and 2) origin and destination availability (OND_AVLs) to compute availability data for each segment based on the data in the inventory replication database 180. The OND_DETs are utilized for each availability request 114 to determine the segmentation data within each request, but the OND_AVLs computation may be utilized if a computation of availability is required (e.g., an associated PONDA cache entry either is out of date, or has not yet been computed and stored in the PONDA cache). The actions of the availability computation instruction set 160 are further described herein with reference to the illustration in FIG. 2. Example processes of accessing a PONDA cache as illustrated in FIG. 1 are further discussed herein with reference to process 600, 700, and 800 of FIGS. 6-8.

Figure 2A:
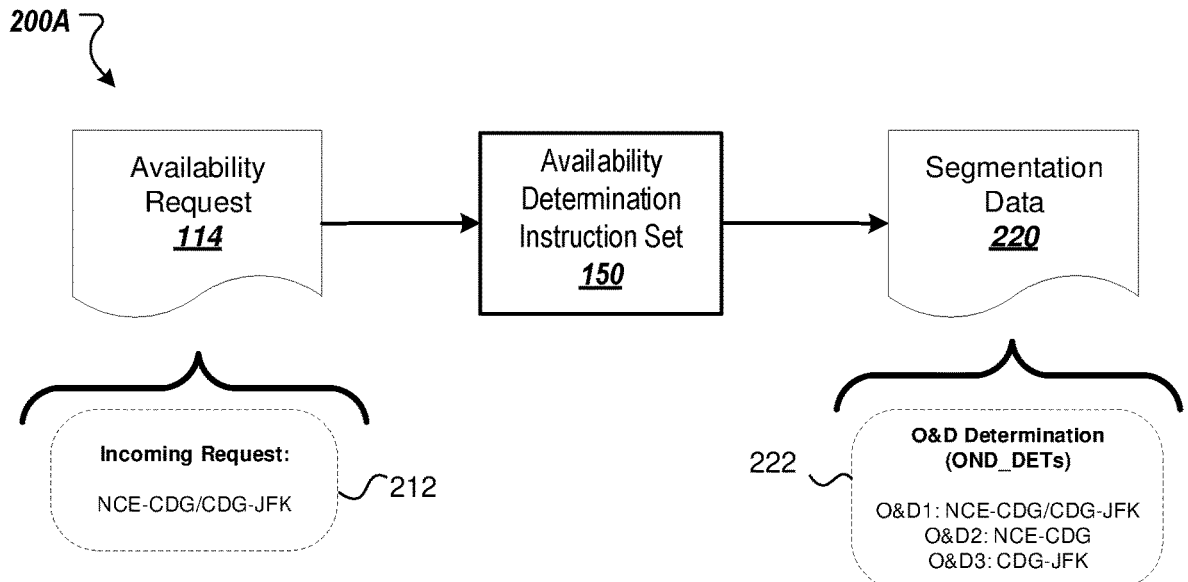
FIGS. 2A-2D illustrate example availability determination and computation processes based on an availability request, according to embodiments of the invention.

FIGS. 2A-2D illustrate an example processes for determining and computing availability results from segmentation data based on receiving an availability request, according to embodiments of the invention. In particular, FIG. 2A illustrates an example environment 200A of a first block for a PONDA cache implementation for determining segments of a received availability request. For example, the availability determination instruction set 150, stored on one or more availability determination server(s) 140, receives an availability request 114 (e.g. from a client device 110 via gateway 122) and determines segmentation data 220. The segmentation data 220 includes segments, such as origin and destination determination data (OND_DETs) 222. Origin and destination (O&D) data is a piece of a travel itinerary used by a revenue management system to forecast a demand such that together with inventory data, an intermediary availability on an O&D can be computed and then used to compute the final availability of a travel-solution (e.g., contains a specific list of flights and can be broken up into many O&Ds). For instance, an availability request for a travel solution A-B-C can be segmented, depending on the configuration, into a single segment A-B-C or into 3 segments: A-B-C, A-B, B-C. As illustrated, an availability request for a flight from Nice Airport in France (NCE) to John F. Kennedy airport in New York, USA (JFK), includes a stop in Paris Charles de Gaulle airport in France (CDG). Thus, the NCE-CDG and CDG-JFK flights can be determined to include three segments as part of the segment data 210 for the availability request: O&D1: NCE-CDG/CDG-JFK (e.g., both segments together as one segment); O&D2: NCE-CDG (e.g., the first flight segment); and O&D3: CDG-JKF (e.g., the second flight segment). Alternatively, the segmentation data is obtained from the PONDA cache 170 directly. For example, after receiving the availability request 114 that includes the NCE-CDG/CDG-JFK flight request, the segmentation data (e.g., O&D1: NCE-CDG/CDG-JFK, O&D2: NCE-CDG, and O&D3: CDG-JKF can be directly accessed from the PONDA cache 170. Alternatively, the segmentation data 220 is obtained by the availability server either from the availability request 114, or may be sent with the availability request as stand-alone-information (e.g., the A-B-C availability request may be sent with the three segments A-B-C, A-B, and B-C).

Figure 2B:
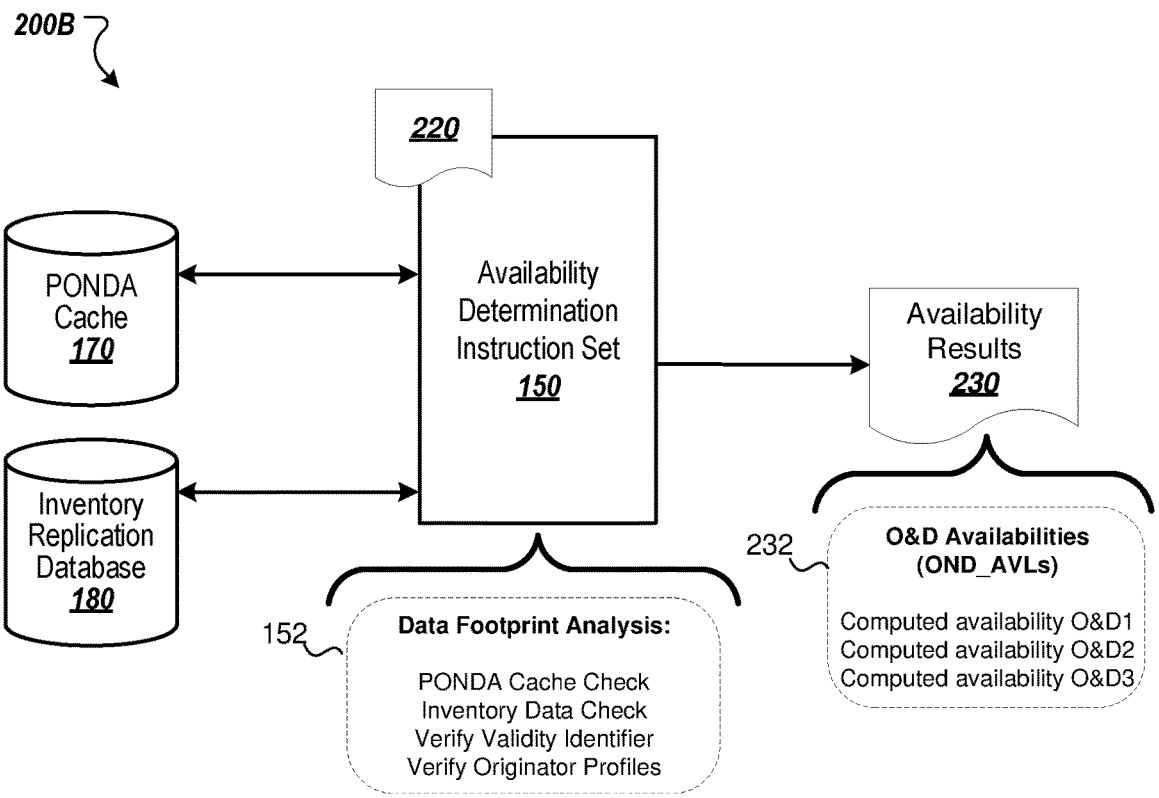
Figure 2C:
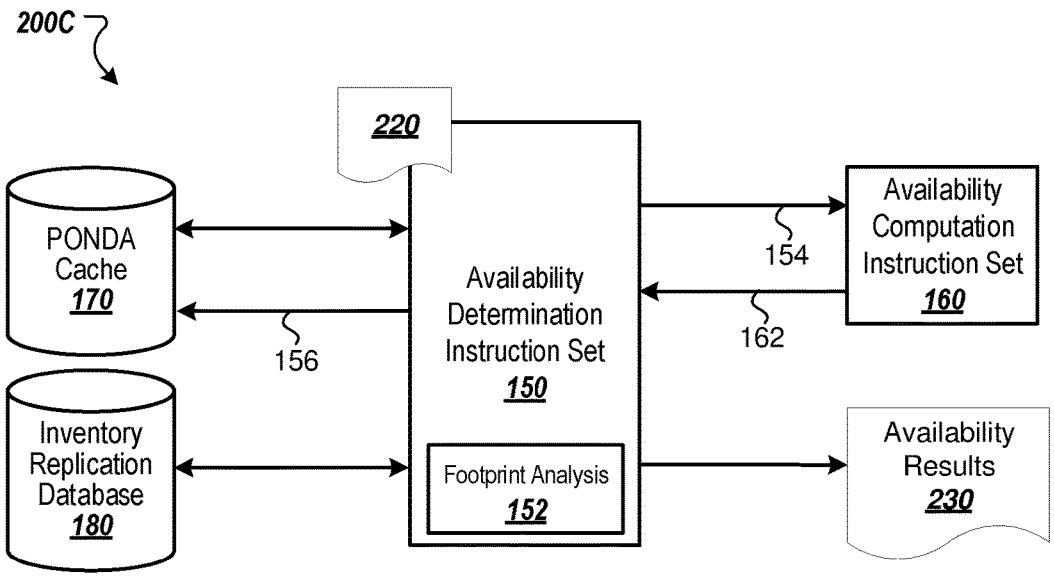
Figure 2D:
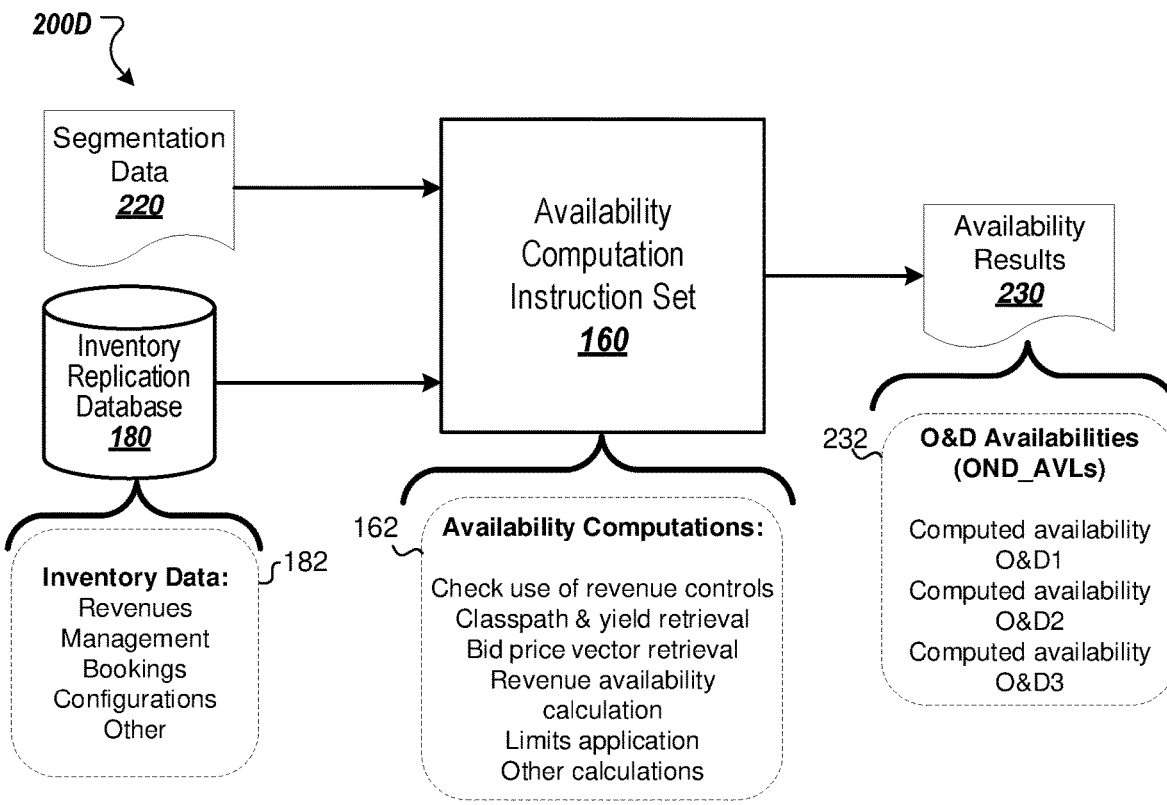

FIGS. 2B-2D illustrate a second block for a PONDA cache implementation for determining availability results based on the determined segmentation data 220. In particular, FIG. 2B illustrates example environment 200B for determining availability results 230 of segmentation data 220 based on a data footprint match between the associated entries of the segments in the PONDA cache 170 and inventory replication database 180. FIG. 2C illustrates example environment 200C for determining availability results 230 of segmentation data 220 based on either (i) a data footprint mismatch between the associated entries of the segments in the PONDA cache 170 and inventory replication database 180, or (ii) a determination that associated entries of one or more segments of the segmentation data 220 are not stored in the PONDA cache 170, thus requiring the computation of the availability results 230 by the availability computation instruction set 150, as illustrated in example environment 200D of FIG. 2D.

As illustrated in the example environment 200B of FIG. 2B, the availability determination instruction set 150 determines, based on the segmentation data 220 via a data footprint analysis 152, that there is a data footprint match between the data entries in the PONDA cache 170 and the associated data entries in the inventory replication database 180. Based on the data footprint match, the availability determination instruction set 150 reads the associated availability information for the segments of the segmentation data 220 as the availability results 230. Thus, the availability results 230 are not needed to be calculated by the availability computation instruction set 150. The availability results 230 includes availability data 232 which includes the O&D availabilities (OND_AVLs) for each segment of the segmentation data 220 (e.g., computed availability O&D1, computed availability O&D2, and computed availability O&D3). In some implementations, the data footprint analysis 152 of the availability determination instruction set 150, includes a PONDA cache check, an inventory data check, a validity identifier verification, an originator profile verification, and additional process described herein.

As illustrated in the example environment 200C of FIG. 2C, the availability determination instruction set 150 determines, based on the segmentation data 220 via a data footprint analysis 152, that there is either a data footprint mismatch between one or more data entries in the PONDA cache 170 and the associated data entries in the inventory replication database 180 of the segmentation data 220, or a determination that associated entries of one or more segments of the segmentation data 220 are not stored in the PONDA cache 170, thus requiring the computation of the availability results 230 by the availability computation instruction set 160. Based on the data footprint mismatch or unavailable entries in the PONDA cache 170, the availability determination instruction set 150 sends a computation request 154 to the availability computation instruction set 160 which computes and returns availability computation results 162 to the availability determination instruction set 150 which can be sent as the availability results 230. After receiving the availability computation results 162, the availability determination instruction set 150 then updates the PONDA cache 170 via a push command 156 with the associated entries for the segmentation data 220. For example, if there was a determined data footprint mismatch, then those associated entries in the PONDA cache 170 would be replaced via the push command 156. And if the associated entries for the segmentation data 220 were determined to be missing in the PONDA cache, then the push command 156 would add those new calculated entries to the PONDA cache 170. The processing of the availability computation instruction set 160 is illustrated in the example environment 200D of FIG. 2D.

As illustrated in the example environment 200D of FIG. 2D, the availability computation instruction set 160 calculates the availability results 230 based on the segmentation data 220 and inventory data 182 via an availability computation analysis. The computations of the availability computation instruction set 160 may be initiated when the availability data is either not available in the PONDA cache 170 or there is a data footprint mismatch between the data entries in the PONDA cache 170 and the data entries in the inventory replication database 180, as discussed herein. For example, based on the revenues management data (e.g., from a revenues management database 132), bookings data (e.g., from bookings database 134), airlines/system configurations data (e.g., from configurations database 136), availability information can be computed for an availability request for each segment. The computation process of computing the availability data 232 (e.g., availability and prices of air flights) at the availability computation instruction set 160 can be resource- and time-consuming in comparison to the first block of the PONDA cache implementation process (e.g., determining the segments such as the OND_DETs). Thus, the PONDA cache implementation processes described herein, first try to match entries in the PONDA cache 170 based on identifiers in the segmentation data 220 compared to the identifiers in the associated data blocks within the in the inventory replication database 180 in order to not have to recompute the availability data 232, and use the previous computation data for each segment as already stored in the easier to access PONDA cache 170.

In some implementations, different availabilities may be computed depending on the point of sale (called also—originator) characteristics such as city, country, agent type, etc. For example, for a flight NCE-JFK we may have more availabilities for a certain class for people booking from France than people booking from USA (or vice-versa).

In an exemplary implementation, the segmentation data 220 and the availability data 232 are stored in the PONDA cache 170. As further discussed herein, FIG. 3 illustrates example database entries for the availability computation process of FIG. 2D as stored in the PONDA cache 170, FIG. 4 illustrates example PONDA cache entries for determination blocks (e.g., OND_DETs) and availability blocks (e.g., OND_AVLs) with respect to an inventory database replication (e.g., inventory replication database 180), and FIG. 5 illustrates example segmentation data for a PONDA cache system that includes validity and profile information (e.g., identifiers used to determine whether a data footprint consistency check for a PONDA cache entry for each segment of an availability request).

Figure 3:
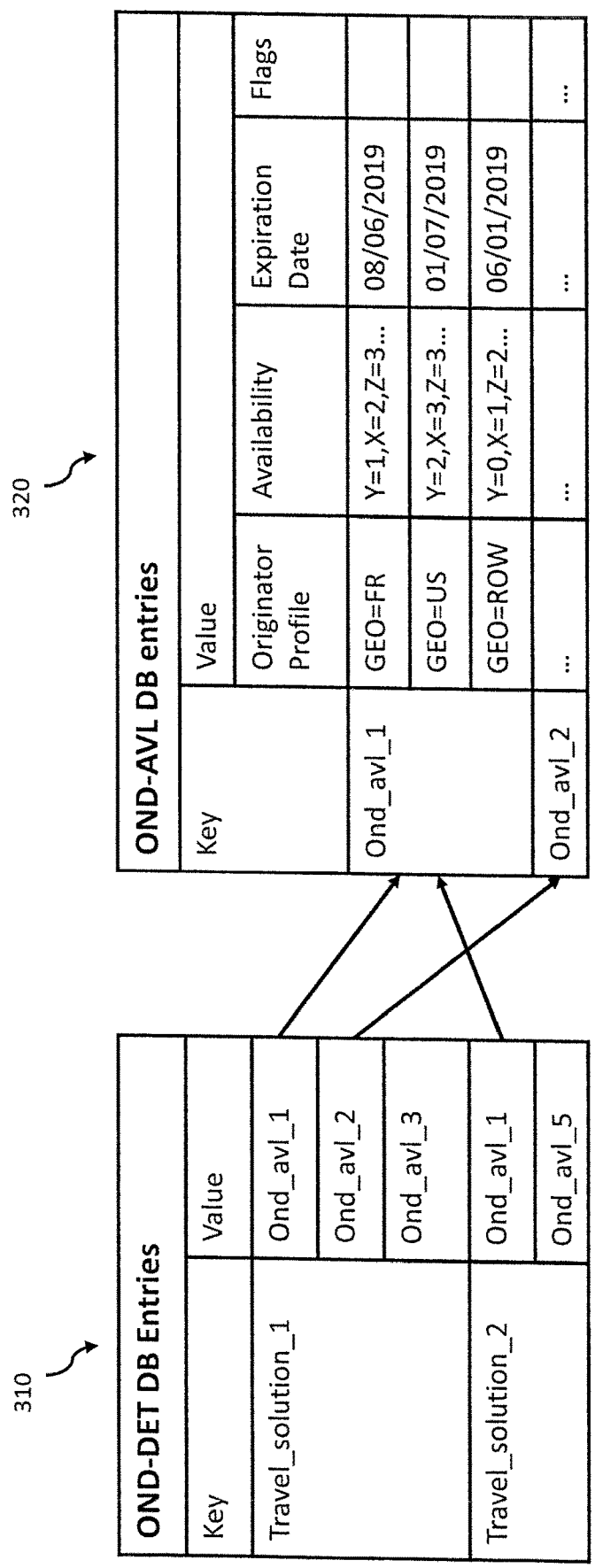
FIG. 3 illustrates example database entries for the availability determination and computation process of FIGS. 2A-2D as stored in the PONDA cache, according to embodiments of the invention.

FIG. 3 illustrates example database entries for the availability computation process of FIG. 2D as stored in the PONDA cache, according to embodiments of the invention. In particular, FIG. 3 illustrates an example data model for the PONDA cache 170. The OND-DET database entries table 310 represents the segmentation data (e.g., segmentation data 220 that includes each segment of the availability request) determined at OND_DETs as stored in the PONDA cache 170. For example, a key entry for Travel_Solution_1 (e.g., an availability request for NCE-CDG-JFK), is stored as three different values (e.g., segments): Ond_avl_1 (e.g., NCE-CDG-JFK), Ond_avl_2 (e.g., NCE-CDG), and Ond_avl_3 (e.g., CDG-JFK). The OND-AVL database entries table 320 represents the availability data (e.g., availability data 232) as stored in the PONDA cache 170. For example, a key entry for Ond_avl_1 (e.g., an availability computation for NCE-CDG-JFK), is stored as a data block that includes several different values (e.g., originator profile, availability, expiration data, flags, etc.), as used by a travel management system (e.g., availability and booking information for booking a flight for NCE-CDG-JFK). The data flow for an availability request for the PONDA Cache implementation begins with receiving an availability query, and replying with availability results for each segment within the availability query, thus there may be several database entries provided from one availability result. Additionally, the same database entry (e.g., Ond_Avl_1) can be part of several availability requests. For example, Travel_Solution_2 also includes the availability block of Ond_avl_1.

Figure 4:
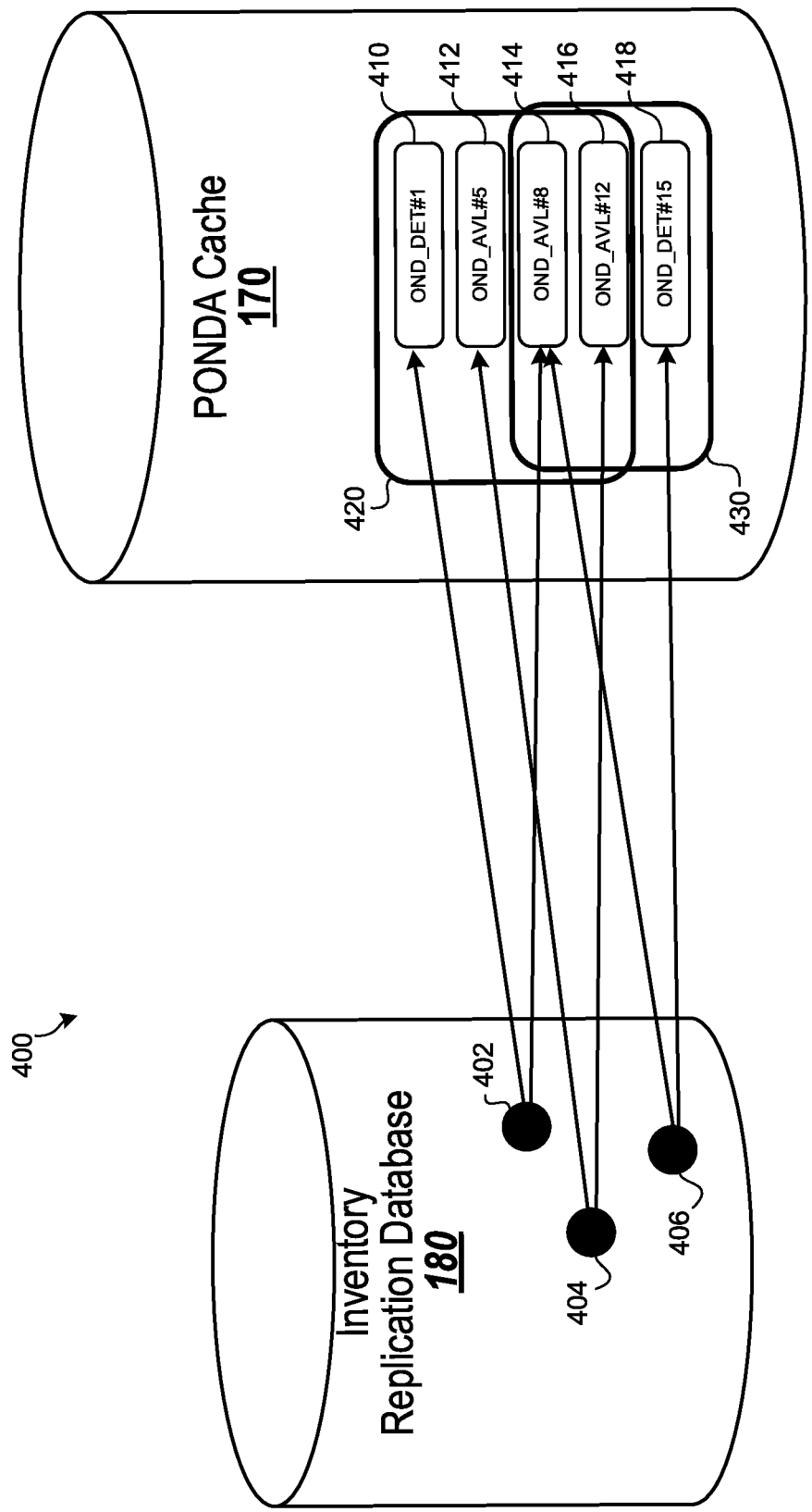
FIG. 4 illustrates example PONDA cache entries for determination blocks and availability blocks with respect to an inventory database replication, according to embodiments of the invention.

FIG. 4 illustrates example PONDA cache entries for determination blocks and availability blocks with respect to an inventory database replication, according to embodiments of the invention. The PONDA cache 170 stores small pieces of computation blocks (e.g., determination and availability data blocks) directly linked to source data via the inventory replication database 180, instead of the final availability data, to easily invalidate availabilities in case of an update (e.g., a PONDA cache data footprint mismatch based on data identifiers as illustrated in FIG. 5). For example, the inventory replication database 180 includes example inventory data blocks 402, 404, 406 (e.g., flight bookings data, revenue management data, airlines/system configurations data, etc.) that are directly linked to small pieces of computation blocks within the PONDA cache 170. For example, travel solution availability 420 includes determination block-1 410, availability block-5 412, availability block-8 414, and availability block-12 416, and travel solution availability 430 includes determination block-15 418, availability block-8 414, and availability block-12 416. Each travel solution availability 420, 430, is segmented by the determination and availability blocks, which are directly tied to the source data (e.g., inventory data blocks 402, 404, 406) the inventory replication database 180 (e.g., a replication of inventory database 138).

Figure 5:
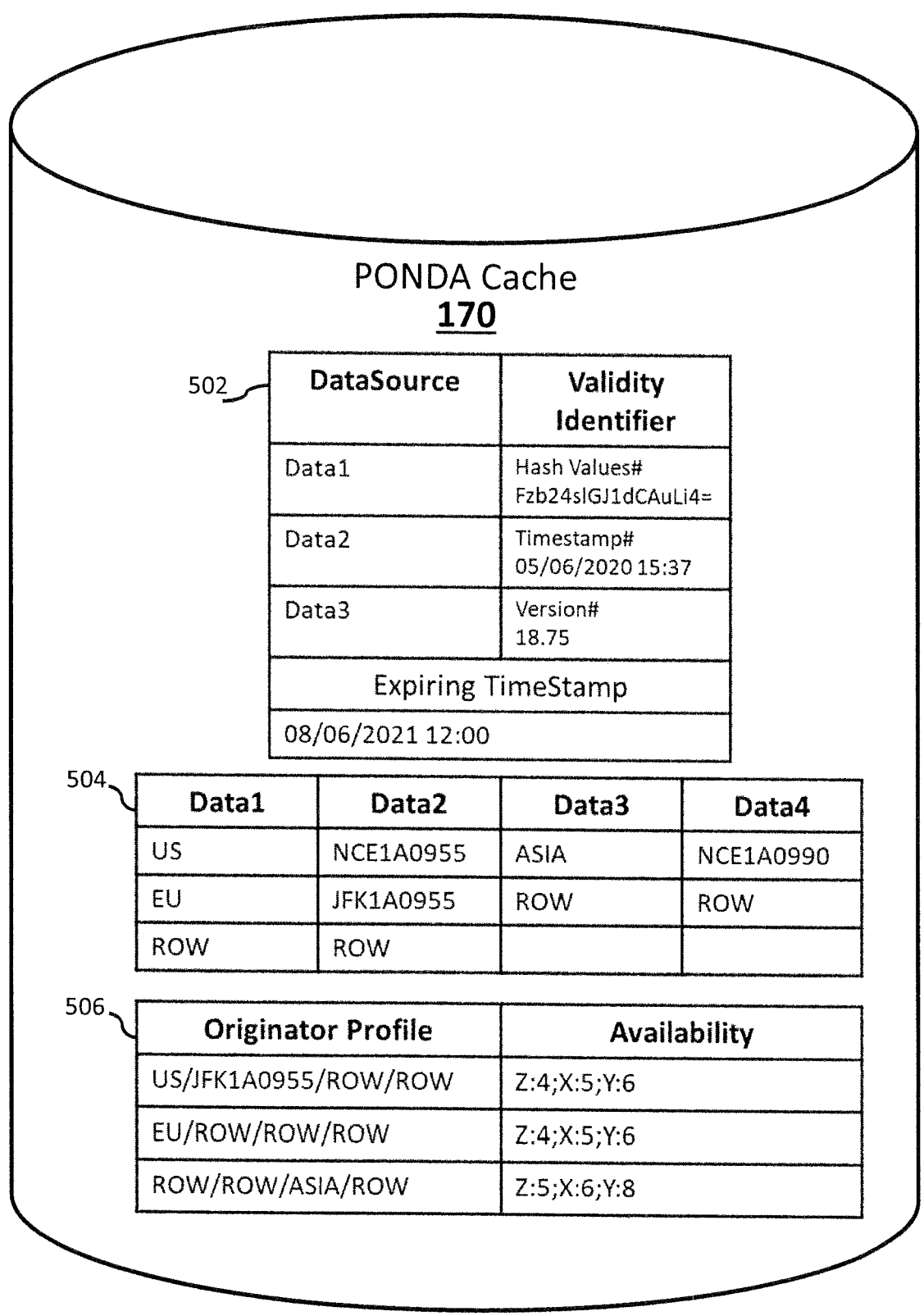
FIG. 5 illustrates example segmentation data for a PONDA cache system that includes validity and profile information, according to embodiments of the invention.

FIG. 5 illustrates example segmentation data for a PONDA cache system that includes validity and profile information, according to embodiments of the invention. The PONDA cache 170 stores small pieces of computation blocks (e.g., determination and availability data blocks such as OND_DETs and OND_AVLs) directly linked to source data via the inventory replication database 180, instead of the final availability data, to easily invalidate availabilities in case of an update (e.g., a PONDA cache data footprint mismatch based on data identifiers as illustrated in FIG. 5). The validity data table 502 includes the different type of validity identifiers that may be used for determining a footprint mismatch between the data blocks stored in the PONDA cache 170 versus what is in the associated source data (e.g., inventory replication database 180) as discussed in reference to FIG. 4. For example, data1 includes a hash value, data2 includes a time stamp, and data3 includes a version number as an identifier. In some embodiments, the "hashes" used may be small binary values (e.g., checksums) computed from larger sets of binary data. The originator profile data table 504 includes originator profiles for each block of data, which includes segmentation data used to compute the OND_AVLs. Originator profile data includes information relative to the customer (e.g., client device 110) which can vary the availability computed according to revenue management system and the inventory settings associated with the respective profile. In some implementations, the originator profile is stored in a PONDA document on the PONDA cache 170, and used to retrieve the appropriate availability according to the customer requesting the availability. Some types of the data for data1, data2, data3, etc. include RAAV, Yields, POS Rules, ABR, and the like. The availability data table 506 includes an example of the availabilities stored for an originator profile. For example, tables 504 and 506 illustrate a case when availability computed vary if computed using originator office NCE1A0950 (corresponding to originator profile EU/ROW/ROW/ROW) or JFK1A0955 (corresponding to US/JFK1A0955/ROW/ROW), so as illustrated in table 506, two segmentations will be then considered to store those two different availabilities and according to the originator profile matching with the request, one or the other segmentations will be considered.

Figure 6:
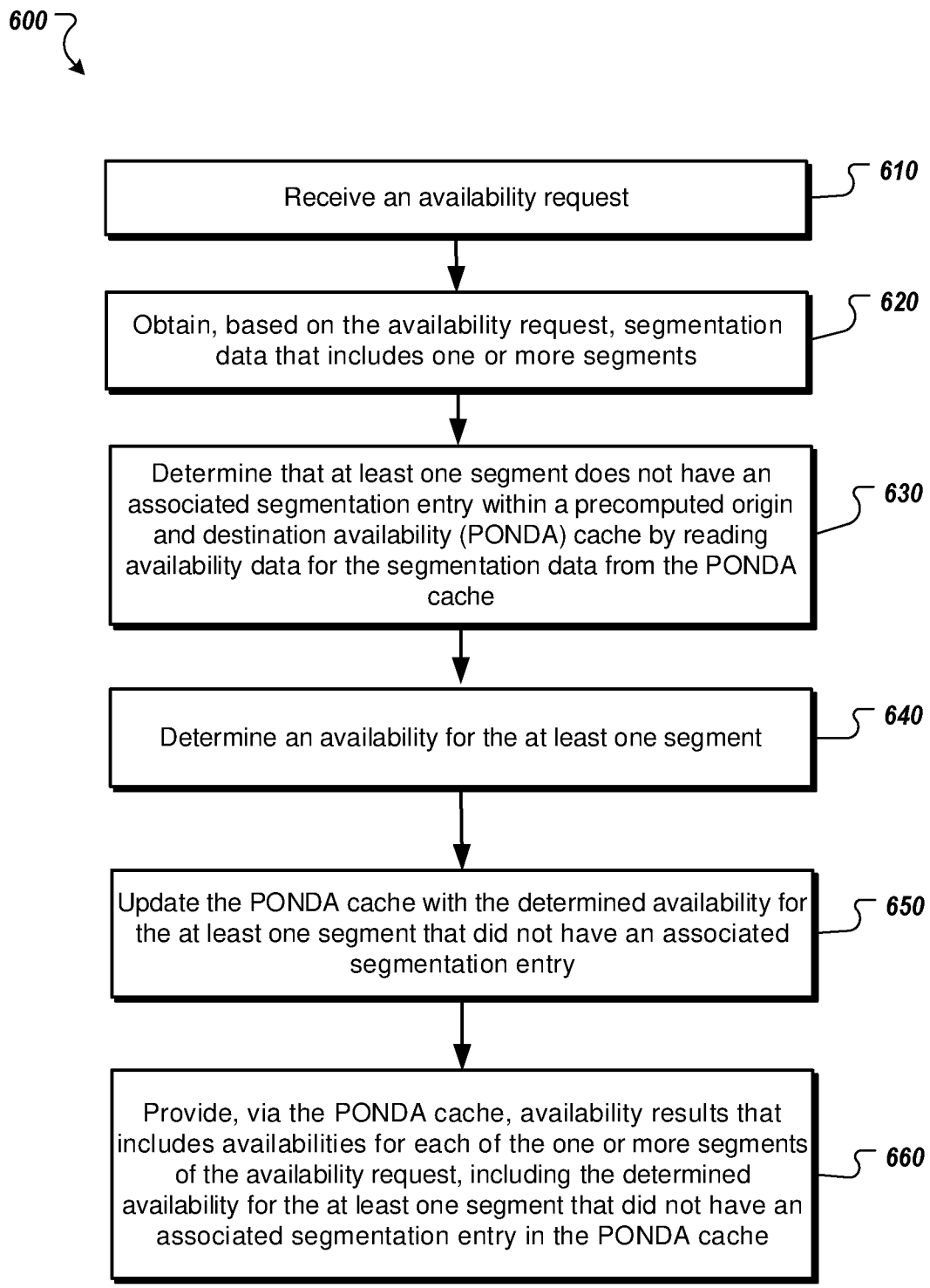
FIG. 6 is a flowchart of an example process for providing availability results based on an availability request, according to embodiments of the invention.

FIG. 6 illustrates a flowchart of an example process 600 for providing availability results based on an availability request in view of a PONDA cache data footprint entry missing, according to embodiments of the invention. Operations of the process 600 can be implemented, for example, by a system that includes one or more data processing apparatus, such as one or more availability determination server(s) 140 of FIG. 1. The process 600 can also be implemented by instructions stored on computer storage medium, where execution of the instructions by a system that includes a data processing apparatus cause the data processing apparatus to perform the operations of the process 600.

The system receives an availability request (610). For example, as illustrated in FIG. 1, a client device 110 initiates an availability request 114 by a requestor via application 112. The availability request 114 may include availability search queries by requesting entities (such as clients, applications, browsers installed on user terminals, etc.) in the course of a search (e.g., airline booking search). A requestor of an availability request 114 may include an airline agency, travel agency, metasearch engine, other dedicated global distribution systems (GDS), as for example airlines reservation systems which provide flight search applications for shopping business like flight booking, and the like.

The system obtains, based on the availability request, segmentation data that includes one or more segments (620). For example, the availability determination instruction set 150, stored on one or more availability determination server(s) 140, receives an availability request 114 (e.g. from a client device 110 via gateway 122) and determines segmentation data 220. The segmentation data 220 includes origin and destination determination data (OND_DETs) 222. Origin and destination (O&D) data is a piece of a travel itinerary used by a revenue management system to forecast a demand such that together with inventory data, an intermediary availability on an O&D can be computed and then used to compute the final availability of a travel-solution (e.g., contains a specific list of flights and can be broken up into many O&Ds).

For instance, an availability request for a travel solution A-B-C can be segmented, depending on the configuration, into a single segment A-B-C or into 3 segments: A-B-C, A-B, B-C. As illustrated, an availability request for a flight from Nice Airport in France (NCE) to John F. Kennedy airport in New York, USA (JFK), includes a stop in Paris Charles de Gaulle airport in France (CDG). Thus, the NCE-CDG and CDG-JFK flights can be determined to include three segments as part of the segment data 210 for the availability request: O&D1: NCE-CDG/CDG-JFK (e.g., both segments together as one segment); O&D2: NCE-CDG (e.g., the first flight segment); and O&D3: CDG-JKF (e.g., the second flight segment). Alternatively, the segmentation data is obtained from the PONDA cache 170 directly. For example, after receiving the availability request 114 that includes the NCE-CDG/CDG-JFK flight request, the segmentation data (e.g., O&D1: NCE-CDG/CDG-JFK, O&D2: NCE-CDG, and O&D3: CDG-JKF can be directly accessed from the PONDA cache 170. Alternatively, the segmentation data 220 is obtained by the availability server either from the availability request 114, or may be sent with the availability request as stand-alone-information (e.g., the A-B-C availability request may be sent with the three segments A-B-C, A-B, and B-C).

The system determines that at least one segment does not have an associated segmentation entry within a PONDA cache by reading availability data for the segmentation data from the PONDA cache (630). For example, as illustrated in the example environment 200C of FIG. 2C, the availability determination instruction set 150 determines, based on the segmentation data 220 via a data footprint analysis 152, that associated entries of one or more segments of the segmentation data 220 are not stored in the PONDA cache 170, thus requiring the computation of the availability results 230 by the availability computation instruction set 160.

The system determines an availability for the at least one segment (640). In some implementations, determining an availability for the at least one segment includes accessing an inventory database replication and processing an availability computation for the at least one segment in response to the determination that at least one segment does not have an associated segmentation entry within the PONDA cache. For example, the availability determination instruction set 150 determines, based on the segmentation data 220 via a data footprint analysis 152, that associated entries of one or more segments of the segmentation data 220 are not stored in the PONDA cache 170, thus requiring the computation of the availability results 230 by the availability computation instruction set 160 for the one or more segments that are not store in the PONDA cache 170. For example, as illustrated in the example environment 200D of FIG. 2D, the availability computation instruction set 160 calculates the availability results 230 based on the segmentation data 220 and inventory data 182 via an availability computation analysis for the one or more segments that are not store in the PONDA cache 170.

The system updates the PONDA cache with the determined availability for the at least one segment that did not have an associated segmentation entry (650). For example, as illustrated in FIG. 2C, after receiving the availability computation results 162, the availability determination instruction set 150 updates the PONDA cache 170 via a push command 156 with the associated entries for the segmentation data 220 (e.g., the at least one segment that did not have an associated segmentation entry).

The system provides, via the PONDA cache, availability results that includes availabilities for each of the one or more segments of the availability request, including the determined availability for the at least one segment that did not have an associated segmentation entry in the PONDA cache (660). For example, after the availability results 230 are compiled at the availability engine 142 one or more availability determination server(s) 140 (e.g., after updating the PONDA cache with the missing availability information for one or more segments of the availability request 114), the availability results 230 are sent to the requester (e.g., client device 110 via gateway 122) in response to the availability request 114.

Figure 7:
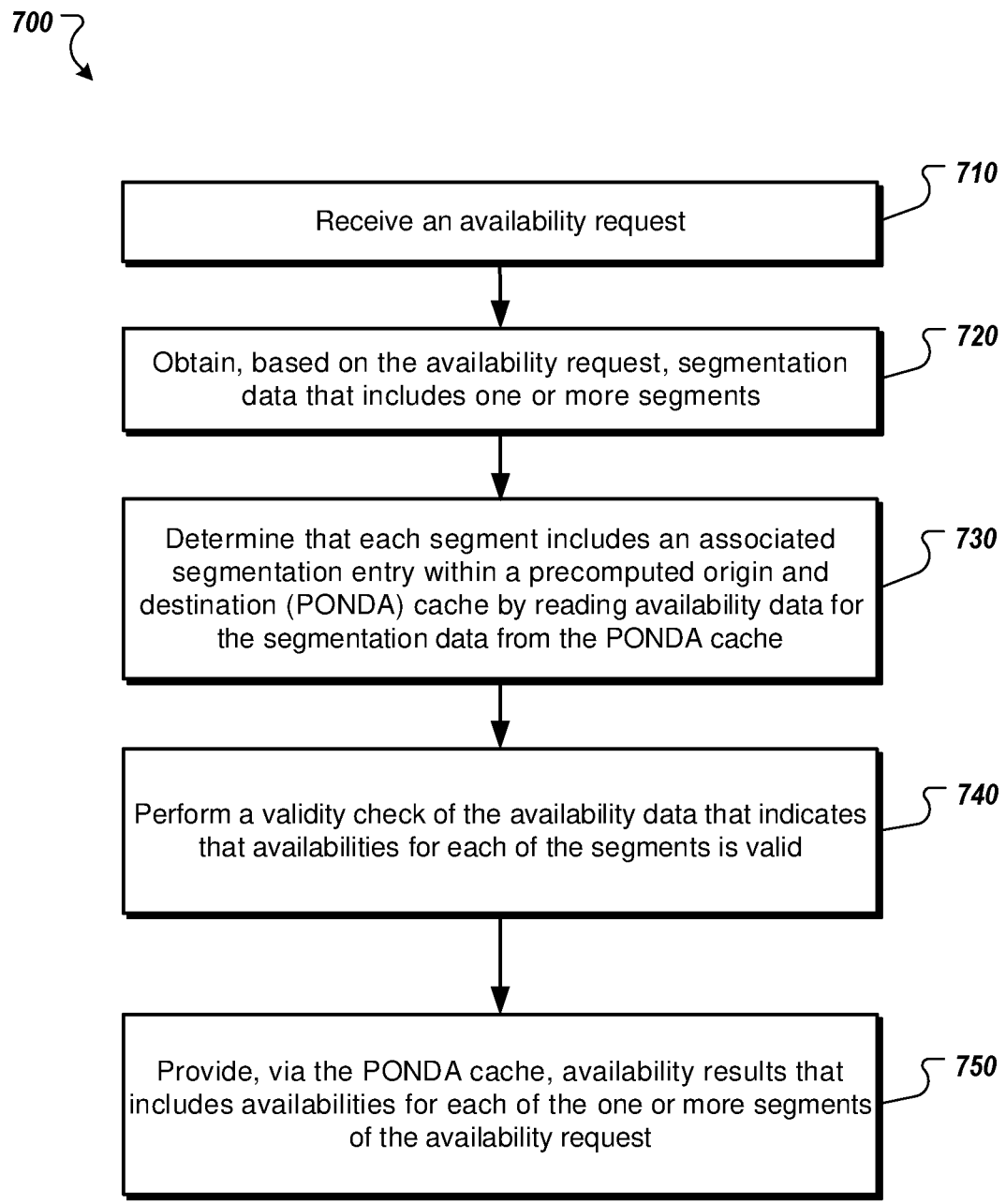
FIG. 7 is a flowchart of an example process for providing availability results based on an availability request, according to embodiments of the invention.

FIG. 7 illustrates a flowchart of an example process 700 for providing availability results based on an availability request in view of a PONDA cache data footprint match, according to embodiments of the invention. Operations of the process 700 can be implemented, for example, by a system that includes one or more data processing apparatus, such as one or more availability determination server(s) 140 of FIG. 1. The process 700 can also be implemented by instructions stored on computer storage medium, where execution of the instructions by a system that includes a data processing apparatus cause the data processing apparatus to perform the operations of the process 700.

The system receives an availability request (710). For example, as illustrated in FIG. 1, a client device 110 initiates an availability request 114 by a requestor via application 112. The availability request 114 may include availability search queries by requesting entities (such as clients, applications, browsers installed on user terminals, etc.) in the course of a search (e.g., airline booking search). A requestor of an availability request 114 may include an airline agency, travel agency, metasearch engine, other dedicated global distribution systems (GDS), as for example airlines reservation systems which provide flight search applications for shopping business like flight booking, and the like.

The system obtains, based on the availability request, segmentation data that includes one or more segments (720). For example, the availability determination instruction set 150, stored on one or more availability determination server(s) 140, receives an availability request 114 (e.g. from a client device 110 via gateway 122) and determines segmentation data 220. The segmentation data 220 includes origin and destination determination data (OND_DETs) 222. Origin and destination (O&D) data is a piece of a travel itinerary used by a revenue management system to forecast a demand such that together with inventory data, an intermediary availability on an O&D can be computed and then used to compute the final availability of a travel-solution (e.g., contains a specific list of flights and can be broken up into many O&Ds).

The system determines that each segment includes an associated segmentation entry within a PONDA cache by reading availability data for the segmentation data from the PONDA cache (730). For example, as illustrated in the example environment 200B of FIG. 2B, the availability determination instruction set 150 determines, based on the segmentation data 220 via a data footprint analysis 152, that there is a data footprint match between the data entries in the PONDA cache 170 and the associated data entries in the inventory replication database 180.

The system performs a validity check of the availability data that indicates that availabilities for each of the segments is valid (740). For example, the availability determination instruction set 150 determines, based on the segmentation data 220 via a data footprint analysis 152, that there is a data footprint match between the data entries in the PONDA cache 170 and the associated data entries in the inventory replication database 180.

The system provides, via the PONDA cache, availability results that includes availabilities for each of the one or more segments of the availability request (750). For example, as illustrated in FIG. 2B, based on the data footprint match, the availability determination instruction set 150 reads the associated availability information for the segments of the segmentation data 220 as the availability results 230. Thus, the availability results 230 are not needed to be calculated by the availability computation instruction set 150 which is computation heavy.

Figure 8:
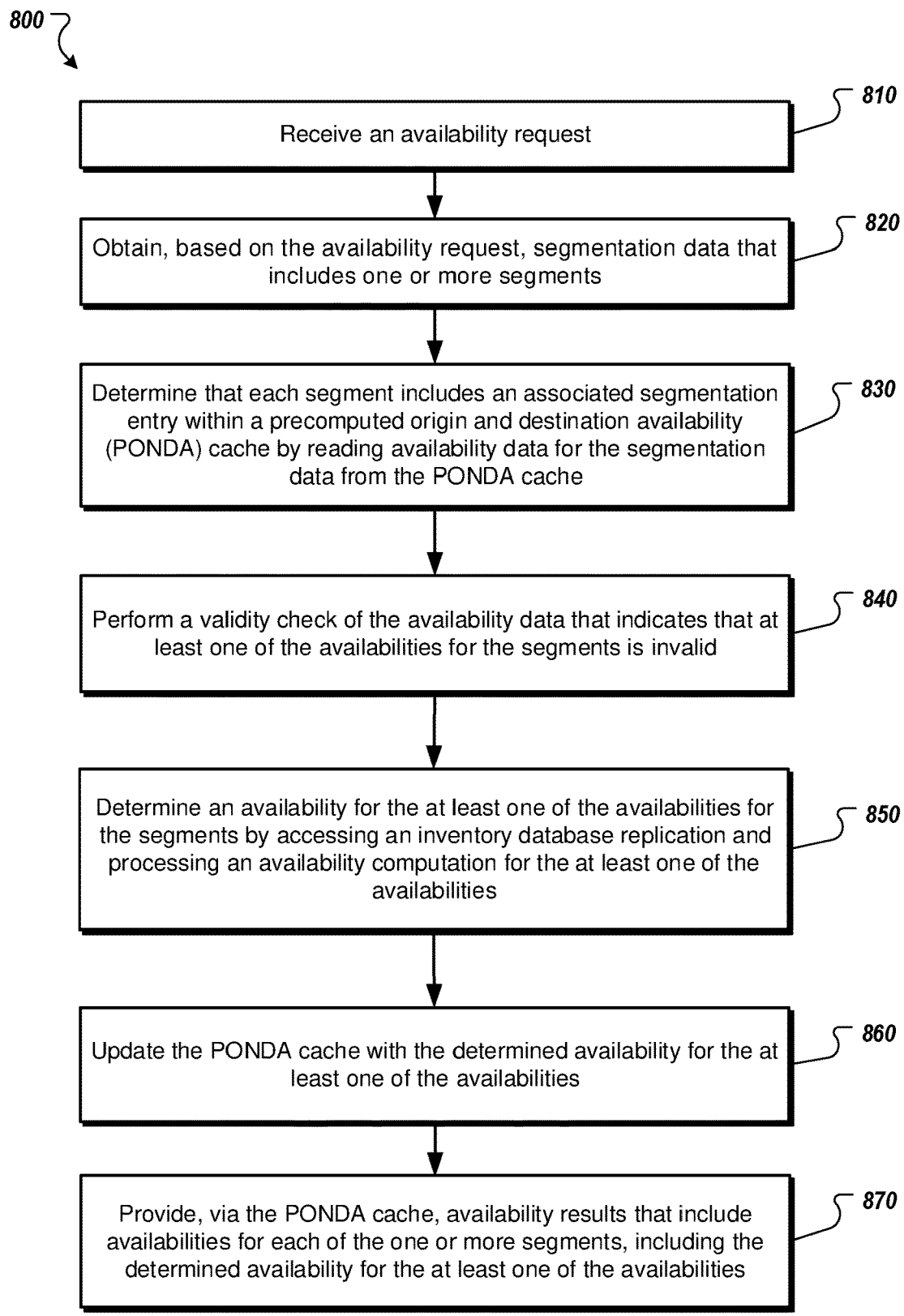
FIG. 8 is a flowchart of an example process for providing availability results based on an availability request, according to embodiments of the invention.

FIG. 8 illustrates a flowchart of an example process 800 for providing availability results based on an availability request in view of a PONDA cache data footprint mismatch, according to embodiments of the invention. Operations of the process 800 can be implemented, for example, by a system that includes one or more data processing apparatus, such as one or more availability determination server(s) 140 of FIG. 1. The process 800 can also be implemented by instructions stored on computer storage medium, where execution of the instructions by a system that includes a data processing apparatus cause the data processing apparatus to perform the operations of the process 800.

The system receives an availability request (810). For example, as illustrated in FIG. 1, a client device 110 initiates an availability request 114 by a requestor via application 112. The availability request 114 may include availability search queries by requesting entities (such as clients, applications, browsers installed on user terminals, etc.) in the course of a search (e.g., airline booking search). A requestor of an availability request 114 may include an airline agency, travel agency, metasearch engine, other dedicated global distribution systems (GDS), as for example airlines reservation systems which provide flight search applications for shopping business like flight booking, and the like.

The system obtains, based on the availability request, segmentation data that includes one or more segments (820). For example, the availability determination instruction set 150, stored on one or more availability determination server(s) 140, receives an availability request 114 (e.g. from a client device 110 via gateway 122) and determines segmentation data 220. The segmentation data 220 includes origin and destination determination data (OND_DETs) 222. Origin and destination (O&D) data is a piece of a travel itinerary used by a revenue management system to forecast a demand such that together with inventory data, an intermediary availability on an O&D can be computed and then used to compute the final availability of a travel-solution (e.g., contains a specific list of flights and can be broken up into many O&Ds).

The system determines that each segment includes an associated segmentation entry within a PONDA cache by reading availability data for the segmentation data from the PONDA cache (830). For example, as illustrated in the example environment 200C of FIG. 2C, the availability determination instruction set 150 determines, based on the segmentation data 220 via a data footprint analysis 152, that associated entries of one or more segments of the segmentation data 220 are not stored in the PONDA cache 170, thus requiring the computation of the availability results 230 by the availability computation instruction set 160.

The system performs a validity check of the availability data that indicates that at least one of the availabilities for the segments is invalid (840). For example, the availability determination instruction set 150 determines, based on the segmentation data 220 via a data footprint analysis 152, that there is a data footprint match between the data entries in the PONDA cache 170 and the associated data entries in the inventory replication database 180.

The system determines an availability for the at least one of the availabilities for the segments by accessing an inventory database replication and processing an availability computation for the at least one of the availabilities (850). For example, based on a PONDA cache data footprint mismatch, as illustrated in the example environment 200D of FIG. 2D, the availability computation instruction set 160 calculates the availability results 230 based on the segmentation data 220 and inventory data 182 via an availability computation analysis for the one or more segments that are not store in the PONDA cache 170 based on a data footprint mismatch between one or more data entries in the PONDA cache 170 and the associated data entries in the inventory replication database 180 of the segmentation data 220.

The system updates the PONDA cache with the determined availability for the at least one of the availabilities (860). For example, as illustrated in FIG. 2C, after receiving the availability computation results 162, the availability determination instruction set 150 updates the PONDA cache 170 via a push command 156 with the associated entries for the segmentation data 220, including the at least one segment that was determined to be invalid (e.g., a footprint mismatch based on one of the validity identifiers).

The system provides, via the PONDA cache, availability results that includes availabilities for each of the one or more segments, including the determined availability for the at least one of the availabilities (870). For example, after the availability results 230 are compiled at the availability engine 142 of one or more availability determination server(s) 140 (e.g., after updating the PONDA cache with the missing availability information for one or more segments of the availability request 114), the availability results 230 are sent to the requester (e.g., client device 110 via gateway 122) in response to the availability request 114.

The PONDA cache implementation process of processes 600, 700, and/or 800 may include one or more of following embodiments.

In some embodiments of the invention, the PONDA cache implementation process of processes 600, 700, and/or 800 may further include determining, based on a validity identifier accessed via an inventory database replication, whether a version of the one or more segments is mismatched with an associated version entry of the PONDA cache.

In some embodiments of the invention, the PONDA cache includes an originator profile associated with each segmentation stored in the PONDA cache. In some embodiments of the invention, whether the version of the one or more segments is mismatched with the associated version entry of the PONDA cache is determined based on data from the originator profile. In some embodiments of the invention, the originator profile includes a plurality of validity identifiers, each validity identifier associated with a respective data source of a plurality of data sources. For example, as illustrated in FIG. 5, the validity identifiers are stored in every database entry and they are shared by all the originator profiles. In some embodiments of the invention, the inventory database replication includes replication data that includes validity identifiers associated with the plurality of data sources.

In some embodiments of the invention, obtain segmentation data that includes one or more segments includes determine segmentation blocks associated with the one or more segments associated with the availability request. For example, splitting a travel availability request (e.g., A-B-C) into travel segments (e.g., A-B, B-C, A-B-C).

In some embodiments of the invention, process the availability computation for the at least one segment includes (e.g., availability computation process) receive, from the inventory database replication, revenues management data, bookings data, and configurations data associated with the at least one of the availabilities, and determine, via an availability computation algorithm, the availability for the at least one of the availabilities based on the revenues management data, the bookings data, and the configurations data associated with the at least one segment. For example, as illustrated in FIG. 2D, the availability computation instruction set 160 calculates the availability results 230 based on the segmentation data 220 and inventory data 182 via an availability computation analysis.

In some embodiments of the invention, the PONDA cache implementation process of process 600, 700, and/or 800 determines which availability requests to store in the PONDA cache, and which ones to not store based on real-time statistics and heuristics to help discarding not popular requests. For example, in some embodiments of the invention, the system determines whether to keep or to purge the availability request and the associated segmentation entries from the PONDA cache based on popularity data (e.g., real-time statistics and heuristics to help discarding not popular requests). In some embodiments of the invention, determine whether to keep or to purge the availability request and the associated segmentation entries from the PONDA cache is further based on a search threshold associated with one or more providers associated with the availability results. For example, the percentages may be configurable per airline, and may be dependent on network and trade off cost-benefit analysis.

Figure 9A:
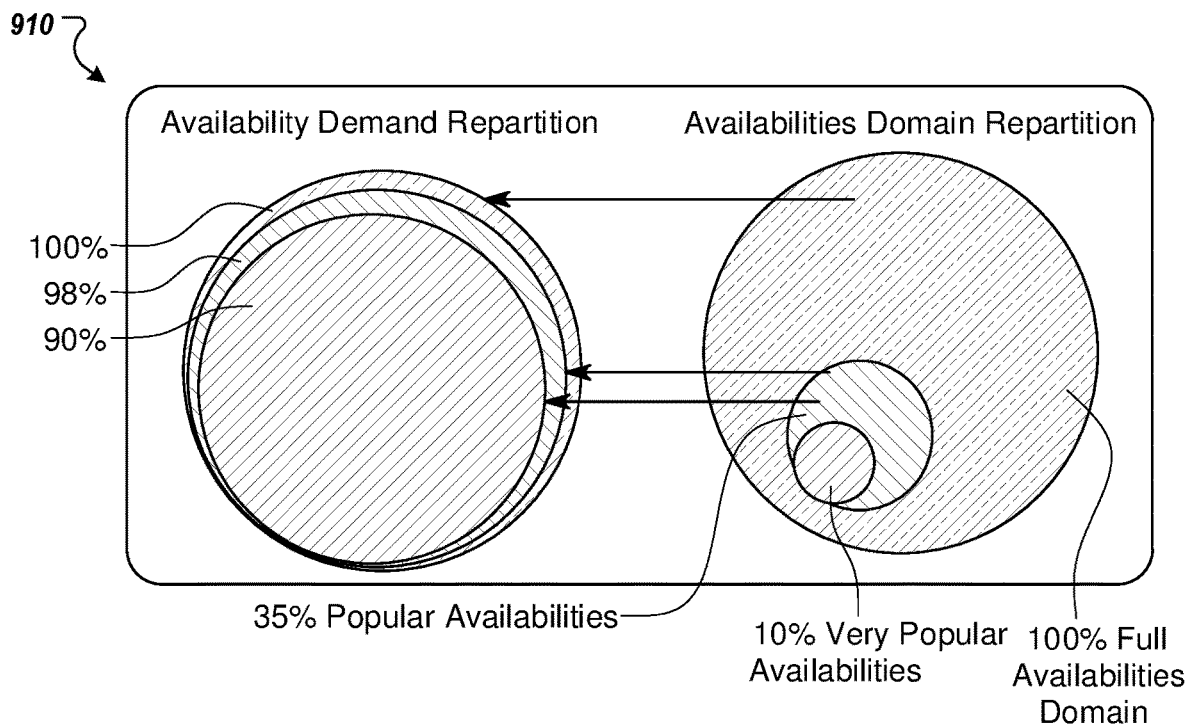
FIGS. 9A and 9B are charts illustrating an example PONDA cache feeding and storage approach, according to embodiments of the invention.
Figure 9B:
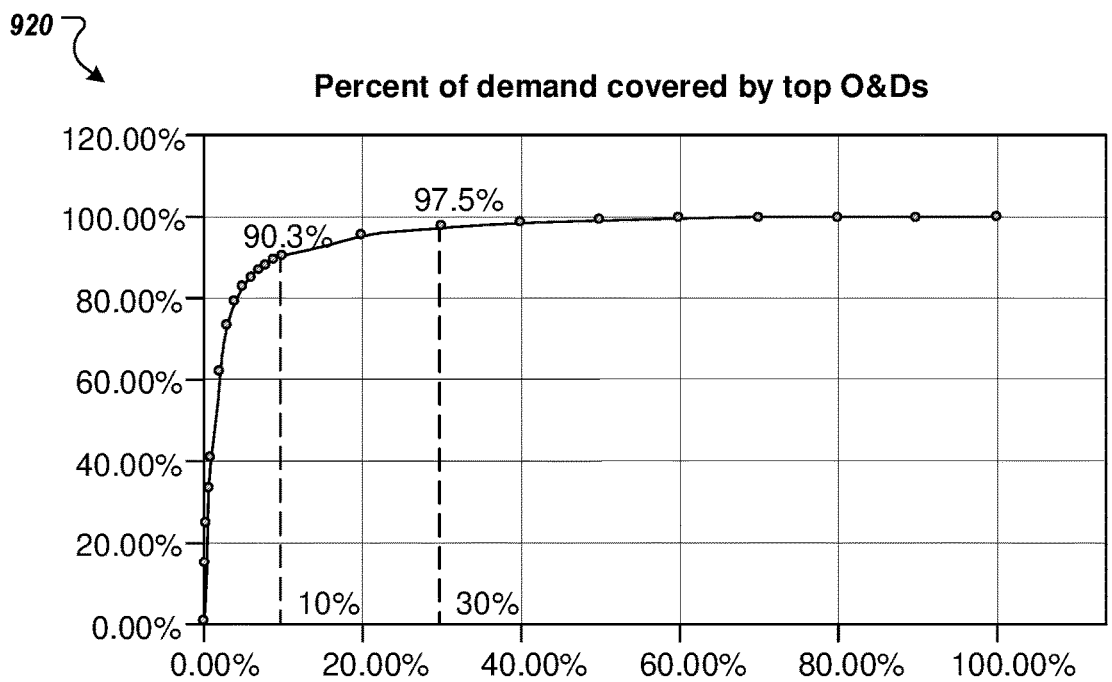

FIG. 9A is a chart 900A illustrating example availability demands for popular availability queries as described herein according to some embodiments of the invention. For example, chart 900A illustrates that only 10% of the most popular availabilities can be used to reply to 90% of the requests. Thus, according to some embodiments of the invention, the PONDA cache 170 may be configured to only store the most popular availabilities to reduce the overall storage footprint. FIG. 9B is a chart 900B illustrating example graph of a percentage of demand covered by popular availability queries that are stored in a PONDA cache according to some embodiments of the invention. For example, chart 900B illustrates that approximately 10% of the most demanded availability searches (most popular for most availability searches, covering ~90% of all availabilities) will be precomputed and stored in a PONDA cache 170. The next ~20% most demanded (covering another 7% of availabilities) will be stored in the PONDA DB only if they are requested because they may be reused in future searches. 60-70% of the computations are "least popular" and never stored in the PONDA DB.

The "availability feeding" approach in the PONDA cache implementation methods described herein depends on the frequency in which an availability is requested. For example, precomputed feeding may include very popular availabilities are precomputed in advance because the probability that they are used at least once is very high. This will maximize the gain of response time for the PONDA cache systems described herein. Lazy feeding may include other popular availabilities that are stored in PONDA cache 170 only if requested because it is possible that they are reused in the future. This can further maximize the gain of processing unites implementing the PONDA cache system. Finally, the third type feeding, no feed, includes the non-popular availabilities that would not be eligible to store in a PONDA cache 170 because the probability that they are used is very low. These "no feed" availabilities can represent a large amount of data, 60-70% of the whole domain, to replay to only 2% of the demand of the availabilities requested. Thus, according to an exemplary embodiment of the invention, the PONDA cache 170 only stores the precomputed very popular availabilities and other popular availabilities and does not store the non-popular availabilities.

Figure 10:
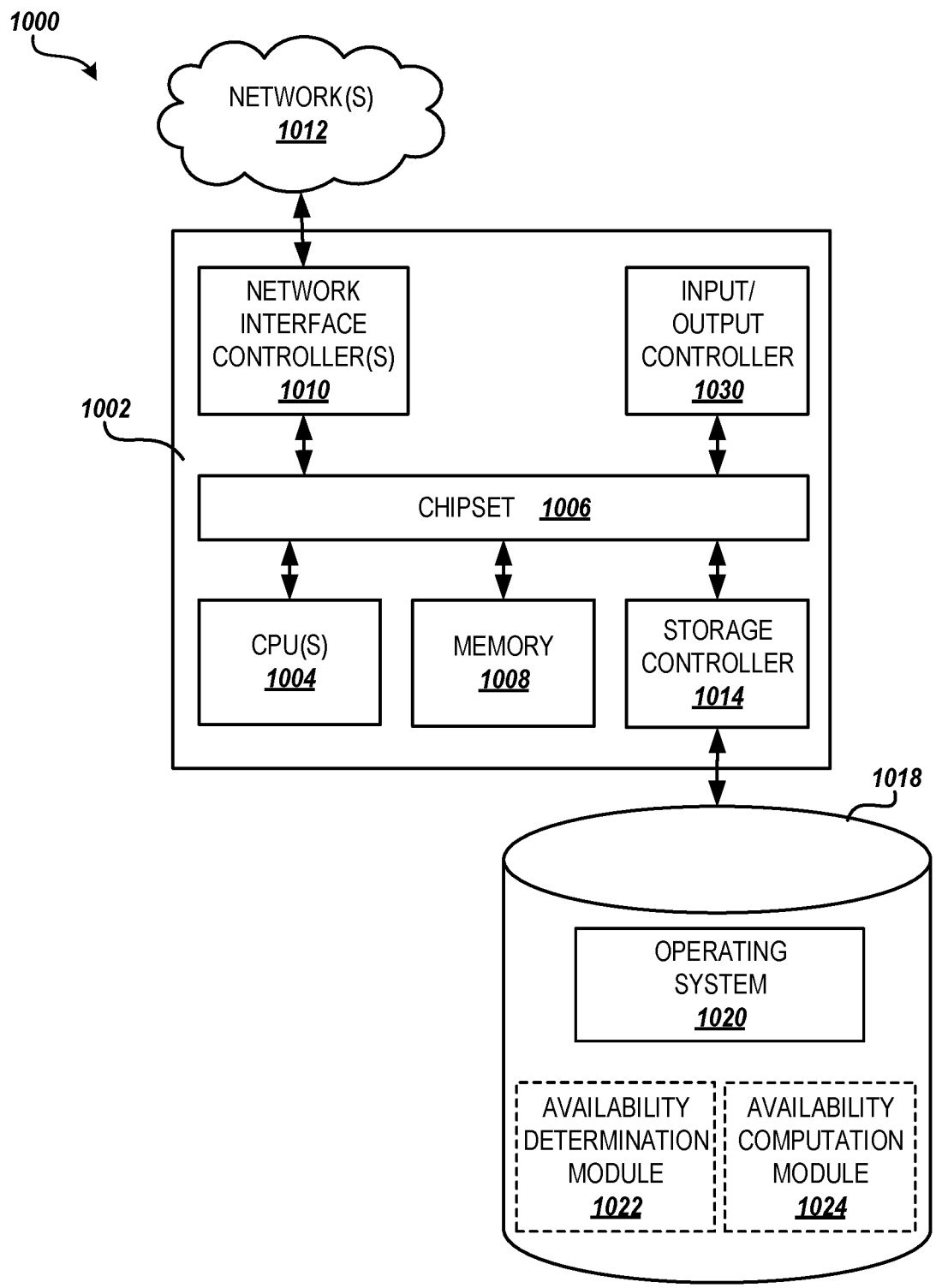
FIG. 10 is a block diagram showing an example computer architecture for a computer capable of executing the software components described herein, according to embodiments described herein.

FIG. 10 illustrates an example computer architecture 1000 for a computer 1002 capable of executing the software components described herein for the sending/receiving and processing of tasks for the CA components. The computer architecture 1000 (also referred to herein as a "server") shown in FIG. 10 illustrates a server computer, workstation, desktop computer, laptop, or other computing device, and may be utilized to execute any aspects of the software components presented herein described as executing on a host server, or other computing platform. The computer 1002 preferably includes a baseboard, or "motherboard," which is a printed circuit board to which a multitude of components or devices may be connected by way of a system bus or other electrical communication paths. In one illustrative embodiment, one or more central processing units (CPUs) 1004 operate in conjunction with a chipset 1006. The CPUs 1004 can be programmable processors that perform arithmetic and logical operations necessary for the operation of the computer 1002.

The CPUs 1004 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1006 provides an interface between the CPUs 1004 and the remainder of the components and devices on the baseboard. The chipset 1006 may provide an interface to a memory 1008. The memory 1008 may include a random access memory (RAM) used as the main memory in the computer 1002. The memory 1008 may further include a computer-readable storage medium such as a read-only memory (ROM) or non-volatile RAM (NVRAM) for storing basic routines that that help to startup the computer 1002 and to transfer information between the various components and devices. The ROM or NVRAM may also store other software components necessary for the operation of the computer 1002 in accordance with the embodiments described herein.

According to various embodiments, the computer 1002 may operate in a networked environment using logical connections to remote computing devices through one or more networks 1012, a local-area network (LAN), a wide-area network (WAN), the Internet, or any other networking topology known in the art that connects the computer 1002 to the devices and other remote computers. The chipset 1006 includes functionality for providing network connectivity through one or more network interface controllers (NICs) 1010, such as a gigabit Ethernet adapter. For example, the NIC 1010 may be capable of connecting the computer 1002 to other computer devices in the utility provider's systems. It should be appreciated that any number of NICs 1010 may be present in the computer 1002, connecting the computer to other types of networks and remote computer systems beyond those described herein.

The computer 1002 may be connected to at least one mass storage device 1018 that provides non-volatile storage for the computer 1002. The mass storage device 1018 may store system programs, application programs, other program modules, and data, which are described in greater detail herein. The mass storage device 1018 may be connected to the computer 1002 through a storage controller 1014 connected to the chipset 1006. The mass storage device 1018 may consist of one or more physical storage units. The storage controller 1014 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 1002 may store data on the mass storage device 1018 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 1018 is characterized as primary or secondary storage, or the like. For example, the computer 1002 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1002 may further read information from the mass storage device 1018 by detecting the physical states or characteristics of one or more particular locations within the physical storage units.

The mass storage device 1018 may store an operating system 1020 utilized to control the operation of the computer 1002. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 1018 may store other system or application programs and data utilized by the computer 1002, such as an availability computation module 1024 to compute availabilities, and an availability determination module 1022 to execute a PONDA cache process, according to embodiments described herein.

In some embodiments, the mass storage device 1018 may be encoded with computer-executable instructions that, when loaded into the computer 1002, transforms the computer 1002 from being a general-purpose computing system into a special-purpose computer capable of implementing the embodiments described herein. These computer-executable instructions transform the computer 1002 by specifying how the CPUs 1004 transition between states, as described above. According to some embodiments, from the availability determination server(s) 140 perspective, the mass storage device 1018 stores computer-executable instructions that, when executed by the computer 1002, perform portions of the processes 600, 700, and 800, for implementing a PONDA cache system, as described herein. In further embodiments, the computer 1002 may have access to other computer-readable storage medium in addition to or as an alternative to the mass storage device 1018.

The computer 1002 may also include an input/output controller 1030 for receiving and processing input from a number of input devices, such as a keyboard, a mouse, a touchpad, a touch screen, an electronic stylus, or other type of input device. Similarly, the input/output controller 1030 may provide output to a display device, such as a computer monitor, a flat-panel display, a digital projector, a printer, a plotter, or other type of output device. It will be appreciated that the computer 1002 may not include all of the components shown in FIG. 10, may include other components that are not explicitly shown in FIG. 10, or may utilize an architecture completely different than that shown in FIG. 10.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computing apparatus comprising:
   one or more processors;
   at least one memory device coupled with the one or more processors; and
   a data communications interface operably associated with the one or more processors, wherein the at least one memory device contains a plurality of program instructions that, when executed by the one or more processors, cause the computing apparatus to:
   receive, at an availability determination server from an availability gateway, an availability request from a requestor;
   obtain, based on the availability request, segmentation data that includes one or more segments;
   determine that each segment includes an associated segmentation entry within a cache by reading availability data for the segmentation data from the cache, wherein the cache is a precomputed origin and destination availability cache that is a database of precomputed availabilities for availability searches, and the availability data comprises availabilities for the one or more segments and is linked to source data used during computation of the availabilities via an inventory replication database at the availability determination server;
   perform a validity check of the availability data that indicates that at least one of the availabilities is invalid as a result of determining that there is a data footprint mismatch between the at least one of the availabilities in the cache and associated data entries in the inventory replication database, wherein the data entries correspond to the source data and are flagged with a data footprint used at computation time of the availabilities;
   determine an availability for the at least one of the availabilities, which is indicated to be invalid by the validity check, by accessing the inventory replication database replication and processing an availability computation to recompute the at least one of the availabilities;
   update the cache by replacing the at least one of the availabilities with the determined availability for the at least one of the availabilities; and
   provide, via the cache, availability results that include availabilities for each of the one or more segments, including the determined availability for the at least one of the availabilities.

2. The computing apparatus of claim 1 wherein the plurality of program instructions that cause the computing apparatus to perform the validity check of the availability data comprise:
   determine, based on a validity identifier accessed via the inventory replication database, whether a hash value, a time stamp, or a version of the one or more segments is mismatched with an associated hash value, time stamp, or version entry of the cache.

3. The computing apparatus of claim 2 wherein whether the hash value, the time stamp, or the version of the one or more segments is mismatched with the associated hash value, time stamp, or version entry of the cache is determined based on data from an originator profile including information relative to the requestor.

4. The computing apparatus of claim 3 wherein the originator profile is associated with the segmentation data stored in the cache, and the originator profile comprises a plurality of validity identifiers that are each associated with a respective data source of a plurality of data sources.

5. The computing apparatus of claim 1 wherein the plurality of program instructions that cause the computing apparatus to obtain the segmentation data that includes the one or more segments comprise:
   determine a plurality of segmentation blocks associated with the one or more segments.

6. The computing apparatus claim 1 wherein the plurality of program instructions that cause the computing apparatus to determine the availability for the at least one of the availabilities by accessing the inventory replication database and processing the availability computation for the at least one of the availabilities comprise:
   receive, from the inventory replication database, revenues management data, bookings data, and configurations data associated with the at least one of the availabilities; and
   determine, via an availability computation algorithm, the availability for the at least one of the availabilities based on the revenues management data, the bookings data, and the configurations data associated with at least one segment.

7. The computing apparatus claim 1 wherein the plurality of program instructions further cause the computing apparatus to:
   determine whether to keep or to purge the availability request and the associated segmentation entries from the cache based on popularity data.

8. The computing apparatus of claim 7 wherein determining whether to keep or to purge the availability request and the associated segmentation entries from the cache is further based on a search threshold associated with one or more providers that are associated with the availability results.

9. A computer-implemented method, comprising:
   receiving, at an availability determination server from an availability gateway, an availability request from a requestor;
   obtaining, based on the availability request, segmentation data that includes one or more segments;
   determining that each segment includes an associated segmentation entry within a cache by reading availability data for the segmentation data from the cache, wherein the cache is a precomputed origin and destination availability cache that is a database of precomputed availabilities for availability searches, and the availability data comprises availabilities for the one or more segments and is linked to source data used during computation of the availabilities via an inventory replication database at the availability determination server;
   performing a validity check of the availability data that indicates that at least one of the availabilities is invalid as a result of determining that there is a data footprint mismatch between the at least one of the availabilities in the cache and associated data entries in the inventory replication database, wherein the data entries correspond to the source data and are flagged with a data footprint used at computation time of the availabilities;
   determining an availability for the at least one of the availabilities, which is indicated to be invalid by the validity check, by accessing the inventory replication database and processing an availability computation to recompute the at least one of the availabilities;
   updating the cache by replacing the at least one of the availabilities with the determined availability for the at least one of the availabilities; and
   providing, via the cache, availability results that include availabilities for each of the one or more segments, including the determined availability for the at least one of the availabilities.

10. The computer-implemented method of claim 9 wherein performing the validity check of the availability data comprises determining, based on a validity identifier accessed via the inventory replication database, whether a hash value, a time stamp, or a version of the one or more segments is mismatched with an associated hash value, time stamp, or version entry of the cache.

11. The computer-implemented method of claim 10 wherein whether the hash value, the time stamp, or the version of the one or more segments is mismatched with the associated hash value, time stamp, or version entry of the cache is determined based on data from an originator profile including information relative to the requestor.

12. The computer-implemented method of claim 11 wherein the originator profile is associated with the segmentation data stored in the cache, and the originator profile comprises a plurality of validity identifiers that are each associated with a respective data source of a plurality of data sources.

13. The computer-implemented method of claim 12 wherein determining whether a version of each of the one or more segments matches with an associated version entry of the cache is based on data from the originator profile.

14. The computer-implemented method of claim 9 wherein obtaining the segmentation data that includes the one or more segments comprises determining a plurality of segmentation blocks associated with the one or more segments.

15. The computer-implemented method of claim 9, wherein determining the availability for the at least one of the availabilities by accessing the inventory replication database and processing the availability computation for the at least one of the availabilities comprises:
   receiving, from the inventory replication database, revenues management data, bookings data, and configurations data associated with the at least one of the availabilities; and
   determining, via an availability computation algorithm, the availability for the at least one of the availabilities based on the revenues management data, the bookings data, and the configurations data associated with at least one segment.

16. The computer-implemented method of claim 15, further comprising:
   determining whether to keep or to purge the availability request and the associated segmentation entries from the cache based on popularity data.

17. The computer-implemented method of claim 16 wherein determining whether to keep or to purge the availability request and the associated segmentation entries from the cache is further based on a search threshold associated with one or more providers associated with the availability results.

18. A non-transitory computer storage medium encoded with a computer program, the computer program comprising a plurality of program instructions that when executed by one or more processors cause the one or more processors to perform operations comprising:
   receive, at an availability determination server from an availability gateway, an availability request from a requestor;
   obtain, based on the availability request, segmentation data that includes one or more segments;
   determine that each segment includes an associated segmentation entry within a cache by reading availability data for the segmentation data from the cache, wherein the cache is a precomputed origin and destination availability cache that is a database of precomputed availabilities for availability searches, and the availability data comprises availabilities for the one or more segments and is linked to source data used during computation of the availabilities via an inventory replication database at the availability determination server;

perform a validity check of the availability data that indicates that at least one of the availabilities is invalid as a result of determining that there is a data footprint mismatch between the at least one of the availabilities in the cache and associated data entries in the inventory replication database, wherein the data entries correspond to the source data and are flagged with a data footprint used at computation time of the availabilities;

determine an availability for the at least one of the availabilities, which is indicated to be invalid by the validity check, by accessing the inventory replication database and processing an availability computation to recompute the at least one of the availabilities;

update the cache by replacing the at least one of the availabilities with the determined availability for the at least one of the availabilities; and provide, via the cache, availability results that include availabilities for each of the one or more segments, including the determined availability for the at least one of the availabilities.

* * * * *

UNITED STATES PATENT AND TRADEMARK OFFICE
CERTIFICATE OF CORRECTION

| | | |
|---|---|---|
| PATENT NO. | : 12,332,785 B2 | Page 1 of 1 |
| APPLICATION NO. | : 18/564688 | |
| DATED | : June 17, 2025 | |
| INVENTOR(S) | : Cyril Colombel et al. | |

It is certified that error appears in the above-identified patent and that said Letters Patent is hereby corrected as shown below:

In the Claims

Column 20, Claim 1, Line 36 reads:
"database replication and processing an availability"
It should read:
-- database and processing an availability --

Signed and Sealed this
Fifteenth Day of July, 2025

Coke Morgan Stewart
*Acting Director of the United States Patent and Trademark Office*